United States Patent Office 3,014,931
Patented Dec. 26, 1961

3,014,931
10-CARBOXY-Δ⁴-ANDROSTENES AND PROCESS FOR THE PRODUCTION THEREOF
Masamoto Nishikawa, Nishinomiya, and Hikoichi Hagiwara, Oyodo-ku, Osaka, Japan, assignors to Takeda Pharmaceutical Industries, Ltd., Osaka, Japan
No Drawing. Filed Mar. 1, 1960, Ser. No. 12,001
Claims priority, application Japan Sept. 30, 1958
16 Claims. (Cl. 260—397.1)

The present application is a continuation-in-part of copending application, Serial No. 841,953, filed September 24, 1959, now abandoned.

The present invention relates to the preparation of $\Delta^4$-3-oxo-19-norsteroid compounds. Features of the present invention which contribute to its feasibility for use in the industrial production of $\Delta^4$-3-oxo-19-norsteroid compounds are inter alia (a) the fact that easily accessible compounds are employed as starting materials and (b) that the reaction conditions are milder than those heretofore employed in the manufacture of $\Delta^4$-3-oxo-19-norsteroid compounds. Some of these compounds have been known as sex hormones, while others have been used as significant intermediates in the preparation of sex hormones, etc.

$\Delta^4$-3-oxo-19-norsteroid compounds have heretofore been prepared as follows:

$\Delta^{1,3,5(10)}$-3-alkoxy-19-norsteroid compounds are reduced to $\Delta^{2,5(10)}$-3-alkoxy-19-norsteroid compounds by the Birch method, and then the latter are converted into the $\Delta^4$-3-oxo-19-norsteroid compounds directly or through $\Delta^{5(10)}$-3-oxo-19-norsteroid compounds. This can be represented by the following scheme (R represents an alkyl group):

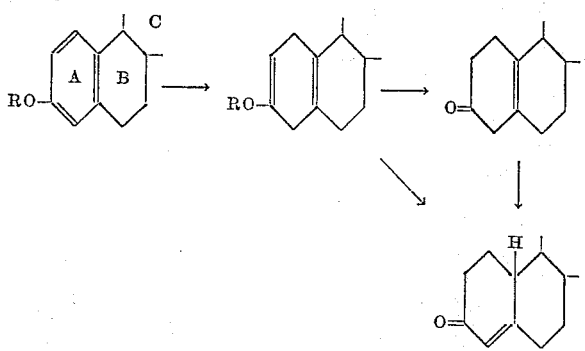

This process, however, entails disadvantages such as requiring complicated steps for preparing the starting material, and the process itself is very intricate.

The $\Delta^4$-3-oxo-19-norsteroid compounds can also be produced by the elimination of formaldehyde from 19-hydroxy-$\Delta^4$-3-oxosteroid compounds, according to the following scheme:

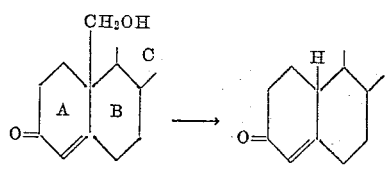

This process, however, is only of theoretical interest, giving only very poor yields. Thus the reaction between 13.6 milligrams of 19-hydroxy-4-androstene-3,17-dione and potassium hydroxide in ethanol [see "Experientia," vol. 11, p. 99 (1955), report by A. S. Meyer], yielded 0.75 milligram of the corresponding 19-norsteroid, 19-nor-4-androstene-3,17-dione, as a byproduct, and the same reaction with 30 milligrams of 19-hydroxy-4-pregnene-3,20-dione [see "J. Org. Chem.," vol. 20, p. 1253 (1955), report by G. W. Barber et al.] gave only 0.9 milligram of 19-nor-4-pregnene-3,20-dione; the yields of the products are no more than 6.2% and 3.3% relative to the starting steroids, respectively. Thus this process is not suited for any practical purpose.

The present invention is directed to the embodiment of practical means for the preparation, on an industrial scale, of the $\Delta^4$-3-oxo-19-norsteroid compounds. Briefly stated, this means—according to the invention— involves essentially the conversion of initial $\Delta^4$-3-oxo-19-oxo (or hydroxy)-steroid compounds into the desired $\Delta^4$-3-oxo-19-norsteroid compounds. A feature of the invention is that the starting steroid compounds can themselves be prepared on an industrial scale and in good yield by subjecting the corresponding 19-unsubstituted $\Delta^4$-3-oxosteroid compound to biological oxidation with a microorganism of the genus Corticium (after the manner described in "Chemical and Pharmaceutical Bulletin," vol. 6 [1958], pp. 226–228), and if desired oxidizing the resulting $\Delta^4$-3-oxo-19-hydroxysteroid compounds with an oxidizing agent such as chromic anhydride in a suitable solvent such as acetic acid, pyridine or acetone (after the maner described in the aforementioned papers by A. S. Meyer and by G. W. Barber et al.).

The means provided by the present invention for achieving the desired object are representable by the following scheme:

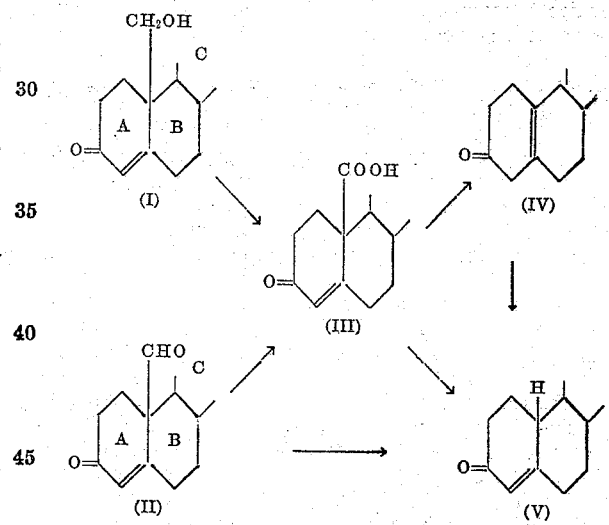

As is evident from this reaction scheme, the desired $\Delta^4$-3-oxo-19-norsteroid compounds can be prepared directly from $\Delta^4$-3,19-dioxosteroid compounds (procedure A, II→V). They can also be prepared from $\Delta^4$-3-oxo-19-hydroxy (or oxo)-steroid compounds through $\Delta^4$-3-oxo-10-carboxy-19-norsteroid compounds; or from $\Delta^4$-3-oxo-10-carboxy-19-norsteroid compounds directly or through $\Delta^{5(10)}$-3-oxo-19-norsteroid compounds (procedures B). This aspect of the invention thus also provides means for preparing $\Delta^{5(10)}$-3-oxo-19-norsteroid compounds from $\Delta^4$-3-oxo-10-carboxy-19-norsteroid compounds. Novel intermediates for synthesizing $\Delta^4$-3-oxo-19-norsteroid compounds are also incidentally provided.

Dealing first with the "B" procedural aspect of the invention, various alternatives are possible:

Thus, $\Delta^4$-3-oxo-19-hydroxy (or oxo)-steroid compounds (I or II) are first oxidized with an oxidizing agent to $\Delta^4$-3-oxo-10-carboxy-9-norsteroid compounds III, and then the products are heated under atmospheric or reduced pressure to convert them into $\Delta^{5(10)}$-3-oxo-19-norsteroid compounds IV and finally treated with a strongly acid or strongly alkaline agent to obtain the final products V. Or, the first intermediates III can be converted directly into the final products V by heating with a strongly acid or strongly alkaline agent.

The starting steroid compounds may belong to the androstane-, pregnane-, cholanic acid- or cholestane-series, but must have a double bond between the positions 4 and 5, an oxo group at the 3-position, and a hydroxyl or oxo group at the 19-position. Thus, for example, 19-hydroxy - 4 - androstene - 3,17 - dione, 19 - hydroxy - 4 - pregnene - 3,20 - dione, methyl 19 - hydroxy - 4 - androstene - 17β - carboxylate, 19 - oxo - 4 - androstene - 3,17-dione, 19-oxo-4-pregnene-3,20-dione, methyl 19-oxo-4-androstene-17β-carboxylate, and so on may all be employed as starting materials in the "B" aspect of this invention. (As the reactions in the processes of this invention are all effected under considerably mild conditions and are all concerned with only the A-ring of the steroid nucleus, the substituents or unsaturated bonds on the B-, C- and D-rings or on side chains are not affected at all by the reactions, and the substituents do not exert any obstructive influence on the reactions either. The starting steroid compounds may thus have oxo-, hydroxyl or lower alkyl groups or halogen atoms at possible positions, and moreover they may have double bond(s) on the B-, C- or D-ring or on a side chain).

In the first step of the "B" form of this invention, the starting steroid compounds (I, II) are converted into Δ⁴-3-oxo-10-carboxy-19-norsteroid compounds III through oxidation. The oxidation can be effected with any oxidizing agent capable of oxidizing the methylol or formyl group to the carboxyl group. As the oxidizing agent, there may, for example, be employed chromium trioxide, permanganic acid, nitric acid, halogenic acids or their salts, lead peroxide, silver oxide, cupric oxide, ferric compounds, hydrogen peroxide and organic peroxides. The oxidation may conveniently be carried out in a suitable solvent in accordance with the kind of oxidizing agent used and of the starting material employed. The solvent may be water, lower fatty alcohols such as methanol and ethanol, lower fatty ketones such as acetone and methyl ethyl ketone, lower fatty ethers such as dioxane and diethyl ether, and aromatic hydrocarbons such as benzene and toluene and petrolic solvents, for instance. The solvent may also be a mixture consisting of two or more of these solvents. The oxidation may be conducted at room temperature (e.g. 20° to 30° C.), or with heating or cooling, and the temperature should be selected so as to make the oxidation proceed smoothly.

In the second step ("B" embodiment), the Δ⁴-3-oxo-10-carboxy-19-norsteroid compounds III prepared as above are converted into Δ⁵⁽¹⁰⁾-3-oxo-19-norsteroid compounds IV by heating. Though this reaction requires no reagent at all, it is preferable to heat the starting compound in a suitable solvent, because the use of a solvent favorably influences the reaction by keeping the reaction system homogeneous and avoiding undesirable local superheating. In this reaction, the double bond between the positions 4 and 5 migrates to the positions between the positions 5 and 10 simultaneously with the elimination of the carboxyl group at the 10-position.

The Δ⁵⁽¹⁰⁾-3-oxo-19-norsteroid compounds IV thus prepared are further converted into Δ⁴-3-oxo-19-norsteroid compounds through the migration of double bond by the action of a strongly acid or a strongly alkaline agent. The agent is, for example, selected from the group consisting of mineral acids such as hydrochloric and sulfuric acid, organic sulfonic acids, sulfonic acid resins, and oxide or hydroxide of alkali or alkaline earth metals. The reaction can advantageously be conducted in an aqueous solvent or an organic solvent such as methanol and ethanol. The reaction is preferably conducted under heating. The double bond between the positions 5 and 10 is thereby migrated to between the positions 4 and 5 to form the Δ⁴-3-oxo-19-norsteroid compounds V.

On the other hand, the Δ⁴-3-oxo-19-norsteroid compounds may preferably directly be obtained from the Δ⁴-3-oxo-10-carboxy-19-norsteroid compounds III or their esters at the carboxyl group in the 10-position by the action of a strongly acid or strongly alkaline agent. This reaction may preferably be carried out in a solvent containing a strongly acid or strongly alkaline agent, and is accelerated by heating. The acid agent may be a mineral acid such as hydrochloric or sulfuric acid, or an organic sulfonic acid, or a sulfonic acid resin, for instance, and the alkaline agent may be oxide or hydroxide of alkali or alkaline earth metals, for instance, the solvent employed in this reaction may, for example, be water, a lower fatty alcohol such as methanol and ethanol, a lower fatty ketone such as acetone and methyl ethyl ketone, or a lower fatty ether such as diethyl ether and dioxane and their mixtures.

In the more direct and therefore more advantageous "A" form of the invention:

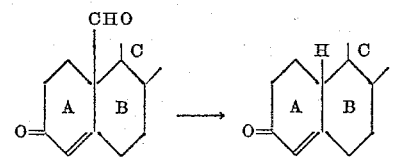

the starting material may again belong to the androstane-, pregnane- or cholanic acid-series. More concretely, 19-oxo - 4 - androstene - 3,17 - dione, 17β - hydroxy - 19-oxo-4-androsten-3-one or its 17α-lower alkylated derivatives, 19-oxo-4-pregnene-3,20-dione, 17α-hydroxy-19-oxo-4 - pregnene - 3,20 - dione, 21 - hydroxy - 19 - oxo - 4 - pregnene - 3,20 - dione, 17α,21 - dihydroxy - 19 - oxo - 4 - pregnene-3,20-dione, 3,19-dioxo-4-androstene-17-carboxylic acid and its lower alkyl esters and so on may all be employed as the starting material in this embodiment of this invention. These starting steroids can be prepared on an industrial scale, as hereinbefore described.

The reaction of this phase of the present invention can be effected by allowing any of the above starting steroid compounds to react with an acid or an alkali agent. The alkali agent may be selected from such strongly alkaline agents as alkali metal oxides, alkali metal hydroxides, alkaline earth metal oxides and alkaline earth metal hydroxides. The acid agent may be selected from mineral acids such as hydrochloric and sulfuric acids, organic sulfonic acids such as methane sulfonic acid, benzene sulfonic acid and toluene sulfonic acid, and sulfonic acid resin, and the solvent employed in this reaction may, for example, be water, a lower fatty alcohol such as methanol or ethanol, a lower fatty ketone such as acetone or methyl ethyl ketone, a lower fatty ether such as di-ethyl ether or dioxane, and their mixtures.

Heating is not necessarily indispensable to conduct the present reaction, but may preferably be applied when it is necessary to accelerate the progress of the reaction.

The Δ⁴-3-oxo-19-norsteroids are therapeutically useful steroid hormones. As is well known, the activity of the 19-norsteroid compounds is generally superior to that of the corresponding steroid hormones. For example, it is known that 19-norprogesterone is superior to progesterone as corpus luteum hormone. Moreover, compounds prepared by the present invention can easily be converted into steroid compounds having known medicinal use. For example, 19-nor-4-androstene-3,17-dione can be converted into 17β-hydroxy-17α-propyl(or ethyl)-19-nor-4-androsten-3-one by the action of propyl (or ethyl) magnesium halide, and the product has useful medicinal properties. Thus, the 17α-propyl derivative is known as an antihypertensive agent, and the 17α-ethyl derivative as an anabolic agent, and the latter is marketed under the registered trade name of "Nilevar." 19-nor-4-androstene-3,17-dione can be converted by reduction into 17β-hydroxy-19-nor-4-androsten-3-one which is further convertible into its β-phenylpropionate (known as protein-anabolic hormone), or the same can be converted into 17β - hydroxy - 17α - ethynyl - 19 - nor - 4 - androsten-3-one which is known as a luteal hormone (sold in the market under the registered trade name of "Norlutin"), and further into 3-(17β-hydroxy-3-oxo-19-nor-4-androsten-17α-yl) propionic acid-lactone, which is an aldosterone blocker or a diuretic. The other products of this invention all have use as intermediates for useful medicaments.

The following examples serve merely as illustrations of the embodiments of this invention and do not restrict the scope of the invention. In the examples, analytical values are shown in weight percent, and "UV- and IR-spectra" mean ultraviolet absorption and infrared absorption spectra, respectively. In the description of UV-spectra- EtOH and EtOH.KOH mean that the observation was conducted on an ethanolic solution and on a solution in ethanolic potassium hydroxide of the samples, respectively. All IR-spectra are observed by the potassium bromide tablet method using a sodium chloride prism. The relationship between part by weight and part by volume is the same as that between gram and milliliter. The $CrO_3$—$H_2SO_4$ mixture is a mixture of 26.72 parts by weight of chromium trioxide, 23 parts by volume of concentrated sulfuric acid and water (enough to make the whole volume 100 parts by volume).

*Example 1*

To a solution of 0.2 part by weight of 19-hydroxy-4-androstene-3,17-dione in 12 parts by volume of anhydrous acetone is added dropwise under stirring 0.5 part by volume of a $CrO_3$—$H_2SO_4$ mixture. After stirring for a while, an additional 0.75 part by volume of $CrO_3$—$H_2SO_4$ mixture is added dropwise to the mixture. Agitation is continued for a while, then the mixture is diluted with water. Excess of chromium trioxide in the mixture is decomposed by the addition of methanol, and the acetone is evaporated under reduced pressure. The residue is extracted with ethyl acetate, and the ethyl acetate solution is shaken with a 5% aqueous sodium bicarbonate solution to extract acid substances. The aqueous solution is neutralized with dilute hydrochloric acid and concentrate under reduced pressure to separate 0.15 part by weight of white crystals. Recrystallization of the product from ether yields 10-carboxy-19-nor-4-androstene-3,17-dione, M.P. 149–150° C. (decomp.).

Esterification of this product with diazomethane gives 10-carbomethoxy-19-nor-4-androstene-3,17-dione, which melts at 135–137° C. after recrystallization from a mixture of acetone and ether.

*Analysis.*—Calcd. for $C_{20}H_{26}O_4$: C, 72.70; H, 7.93. Found: C, 72.45; H, 7.69.

Specific rotation: $[\alpha]_D = +273°$ (dioxane).

*Example 2*

A solution of 0.35 part by weight of 10-carboxy-19-nor-4-androstene-3,17-dione (obtained according to Example 1) in 2 parts by volume of pyridine is gradually heated to 120° C., generation of carbon dioxide beginning at a temperature of about 70–80° C. The mixture is heated at 120° C. for 5 minutes, and the pyridine is evaporated under reduced pressure. The residue is dissolved in water and the solution is extracted with ether. The ethereal solution is washed with dilute hydrochloric acid and an aqueous solution of sodium bicarbonate, successively, and, after being dried, is concentrated to obtain 0.3 part by weight of crude crystals. Recrystallization of the product from ether gives 19-nor-5(10)-androstene-3,17-dione, M.P. 142–145° C.

*Analysis.*—Calcd. for $C_{18}H_{24}O_2$: C, 79.38; H, 8.88. Found: C, 79.32; H, 8.85.

Specific rotation: $[\alpha]_D^{24} = +270°$ (chloroform).

UV-spectrum: No absorption maximum can be observed in the range between 220 and 340 mμ (in methanolic solution).

$\lambda_{max.}^{EtOH.KOH}$ 238 mμ ($E=16,000$)

IR-spectrum: $\lambda_{max.}$ 5.77μ, 5.82μ.

*Example 3*

A solution of 0.1 part by weight of 19-nor-5(10)-androstene-3,17-dione obtained according to Example 2 in methanolic hydrochloric acid is heated on a water-bath for several minutes, and the methanol is evaporated. To the residue, water is added to separate crystals. The product is recrystallized from ether to yield 0.08 part by weight of 19-nor-4-androstene-3,17-dione whose properties are in good accord with those of an authentic specimen.

*Example 4*

A solution of 0.1 part by weight of 10-carboxy-19-nor-4-androstene-3,17-dione (obtained according to Example 1) in a mixture of 5 parts by volume of methanol and 2 to 3 drops (when 1 part by volume is equal to 1 milliliter) of concentrated hydrochloric acid is warmed on a water-bath for 10 minutes, and the mixture is concentrated under reduced pressure. To the residue is added water to separate crude crystals. Recrystallization from ether of the product gives 0.08 part by weight of 19-nor-4-androstene-3,17-dione.

*Analysis.*—Calcd. for $C_{18}H_{24}O_2$: C, 79.39; H, 8.88. Found: C, 79.06; H, 8.75.

Special rotation: $[\alpha]_D +135°$ (chloroform)

UV-spectrum: $\lambda_{max.}^{EtOH}$ 238 mμ ($E=17,000$)

IR-spectrum: $\lambda_{max.}$ 5.75, 6.00, 6.17μ

*Example 5*

To a solution of 0.2 part by weight of 19-hydroxy-4-pregnene-3,20-dione in 12 parts by volume of anhydrous acetone is added dropwise a $CrO_3$—$H_2SO_4$ mixture while the reaction system is agitated. Agitation is continued for a while, then the mixture is diluted with water. The diluted mixture is concentrated after the addition of a small quantity of methanol. The concentrate is extracted with ethyl acetate, and the extract is agitated with 4% aqueous solution of sodium bicarbonate. The aqueous solution is carefully neutralized with dilute hydrochloric acid. The mixture is extracted again with ethyl acetate and the ethyl acetate layer is evaporated to obtain crude 10-carboxy-19-nor-4-pregnene.

A methanolic solution of the product is warmed together with two drops of concentrated hydrochloric acid on a water-bath for 10 minutes. From the mixture, the methanol is distilled off, and water is added to the residue to separate crystals, whose recrystallization from a mixture of acetone and ether gives 0.065 part by weight of 19-norprogesterone, M.P. 146–147° C. The properties of the product are in good agreement with those of an authentic specimen.

*Example 6*

To a solution of 0.2 part by weight of 19-oxo-4-androstene-3,17-dione in 12 parts by volume of anhydrous acetone 0.75 part by volume of a $CrO_3$—$H_2SO_4$ mixture is added dropwise with stirring. Stirring is continued for a while, the mixture is diluted with water, and then the excess of chromium trioxide is decomposed by the addition of methanol. The acetone is evaporated under reduced pressure, and the residue is extracted with ethyl acetate. From the ethyl acetate layer, the acid substances are extracted by means of 5% aqueous sodium bicarbonate solution. The aqueous layer is neutralized with dilute hydrochloric acid and concentrated under reduced pressure. The separated crystals are 10-carboxy-19-nor-4-androstene-3,17-dione, M.P. 149–150° C. The properties of the p oduct are in good accord with those of the product of Example 1. The product can be converted into 19-nor-4-androstene-3,17-dione in the same manner as shown in Examples 2 and 3.

*Example 7*

To a solution of 0.1 part by weight of 19-oxo-4-androstene-3,17-dione in 2 parts by volume of acetone is added dropwise a solution of 0.05 part by weight of potassium permanganate in 4 parts by volume of acetone. The mixture is stirred for 12 hours at a temperature of about 0–5° C. The manganese dioxide formed is removed by filtration, and the filtrate is diluted with water. The diluted solution is acidified with dilute hydrochloric acid and then extracted with chloroform. The acid substances in the extract are again extracted with an aqueous solution of sodium bicarbonate. The aqueous layer, after the addition of dilute hydrochloric acid, is concentrated under reduced pressure to separate 10-carboxy-19-nor-4-androstene-3,17-dione whose properties are in good agreement with those of the product of Example 1. This product can be converted into 19-nor-4-androstene-3,17-dione in a manner similar to that described in Examples 2 and 3 or Example 4.

*Example 8*

A solution of 0.2 part by weight of 19-oxo-4-androstene-3,17-dione in 5 parts by volume of methanol is stirred dropwise into 35 parts by volume of 4% aqueous solution of sodium hydroxide, whereupon the mixture becomes turbid and then crystals begin to precipitate. After stirring for a short time, the crystals are collected by filtration to give 0.15 part of crude crystals of 19-nor-4-androstene-3,17-dione. The product purified by recrystallization from ether melts at 164–166° C.

Specific rotation: $[\alpha]_D^{20} = +132°$ (chloroform).

*Example 9*

A solution of 0.1 part by weight of 19-oxo-4-pregnene-3,20-dione (prepared, for example, by oxidizing 19-hydroxy-4-pregnene-3,20-dione with chromic anhydride in acetic acid) in a small volume of methanol is added dropwise in 30 parts by volume of 4% aqueous solution of sodium hydroxide while stirring, and stirring is continued a little longer. The crystals precipitated are collected by filtration to give 0.05 part by weight of pure 19-nor-4-pregnene-3,20-dione melting at 146–147° C., and having the following constants.

UV-spectrum: $\lambda_{max}$ 240 m$\mu$
Specific rotation: $[\alpha]_D = +145°$

*Example 10*

17α-hydroxy-19-oxo-4-pregnene-3,20-dione, the starting steroid of this example, is a new compound and can be prepared e.g. as follows:

To a solution of 1.2 parts by weight of 17α,19-dihydroxy-4-pregnene-3,20-dione in 160 parts by volume of acetone is added dropwise 1.2 parts by volume of $CrO_3$—$H_2SO_4$ mixture with stirring, and stirring is further continued for a while. To the reaction mixture are added 10 parts by volume of methanol and a large volume of water, and the mixture is concentrated under reduced pressure to precipitate crystals. The crystals are collected by filtration, thoroughly washed with water and dried to give 1.0 part of 17α-hydroxy-19-oxo-4-pregnene-3,20-dione melting at 213–215° C. Upon recrystallization from methylene chloride and benzene, the product melts at 215–217° C.

UV-spectrum: $\lambda_{max}^{EtOH}$ 246 m$\mu$ ($\epsilon = 12,100$)

*Analysis.*—Calcd. for $C_{21}H_{28}O_4$: C, 73.22; H, 8.19. Found: C, 75.74; H, 8.89.

A solution of 0.1 part by weight of 17α-hydroxy-19-oxo-4-pregnene-3,20-dione obtained as above in 8 parts by volume of methanol is dropped into 20 parts by volume of 4% aqueous solution of sodium hydroxide with stirring, and stirring is further continued for 30 minutes, whereupon crystals precipitate. After being collected by filtration, the crystals are thoroughly washed with water, and dissolved in a mixture of equal volumes of methylene chloride and benzene. The solution is submitted to adsorption column chromatography on magnesium silicate, and from the fraction eluted with a mixture of methylene chloride and benzene (1:1), there is obtained 0.05 part by weight of 17α-hydroxy-19-nor-4-pregnene-3,20-dione melting at 200–202° C.

*Analysis.*—Calcd. for $C_{20}H_{28}O_3$: C, 75.91; H, 8.92. Found: C, 75.74; H, 8.89.

The starting materials in the present invention, $\Delta^4$-3-oxo-19-hydroxy (or oxo)-steroid compounds, can be prepared by, for example, the means disclosed in the following papers:

(1) Herzig, Ehrenstein: J. Org. Chem., 17, 713 (1952) (19-hydroxy-3-oxo-4-androstene-17β-carboxylic acid).

(2) Barber, Ehrenstein: J.A.C.S., 76, 2026 (1954) (19-hydroxy-4-pregnene-3,20-dione; 19,21-dihydroxy-4-pregnene-3,20-dione).

(3) Barber, Ehrenstein: J. Org. Chem., 19, 1758 (1954) (same compounds with those disclosed in (2)).

(4) Ehrenstein et al.: ibid., 21, 774 (1956) (19-hydroxy-4-androstene-3,17-dione).

(5) Hayano, Dorfman: Arch. Biochem. Biophys. 55, 289 (1955) (19,21-dihydroxy-4-pregnene-3,20-dione).

(6) Zaffaroni et al.: Chem. Ind. (London), 534 (1955) (same compound with that disclosed in (5)).

(7) Kahnt, Neher, Wettstein: Helv. Chim. Acta, 38, 1237 (1955) (same compound with that disclosed in (5)).

(8) Levy, Kushinsky: Arch. Biochem. Biophys. 55, 290 (1955); 58, 245 (1955) (17α,19,21-trihydroxy-4-pregnene-3,20-dione).

(9) Neher, Wettstein: Helv. Chim. Acta, 39, 2026 (1956) (same compound with that disclosed in (8)).

(10) Meyer: Experientia, 11, 99 (1955) (19-hydroxy-4-androstene-3,17-dione; 19-oxo-4-androstene-3,17-dione).

(11) Colton: U.S. Patent 2,819,277 (17β,19-dihydroxy-17α-ethyl-4-androsten-3-one).

Having thus disclosed the invention, what is claimed is:

1. 10-carboxy-19-nor-4-androstene-3,17-dione.
2. 10-lower carbalkoxy-19-nor-4-androstene-3,17-dione.
3. 10-carbomethoxy-19-nor-4-androstene-3,17-dione.
4. 17α-hydroxy-19-oxo-4-pregnene-3,20-dione.
5. A process which comprises heating on the water-bath a member selected from the group consisting of 10-carboxy-19-nor-4-androstene-3,17-diones, 19-oxo-4-androstene-3,17-diones, 19-nor-5(10)-androstene-3,17-diones, 10-carboxy-19-nor-4-pregnene-3,20-diones and 19-oxo-4-pregnene-3,20-diones in a medium selected from the group consisting of water, lower alkanols and mixtures thereof in the presence of a member selected from the group consisting of mineral acids and alkali metal hydroxides whereby the starting compound is converted to the corresponding 19-nor-4-androstene-3,17-diones, 19-nor-4-androstene-3,17-diones, 19-nor-4-androstene-3,17-diones, 19-nor-4-pregnene-3,20-diones and 19-nor-4-pregnene-3,20-diones, respectively.
6. A process for the production of an intermediate useful in the synthesis of $\Delta^4$-3-oxo-19-nor-steroid, which comprises subjecting a member selected from the group consisting of 19-hydroxy-4-androstene-3,17-diones, 19-oxo-4-androstene-3,17-diones, 19-hydroxy-4-pregnene-3,20-diones and 17,19-dihydroxy-4-pregnene-3,20-diones to the action of an oxidizing agent selected from the group consisting of hexavalent chromium compounds and compounds of manganese with one of the valencies 4 and 7, whereby the starting compound is converted to the corresponding 10-carboxy-19-nor-4-androstene-3,17-diones, 10-carboxy-19-nor-4-androstene13,17-diones, 10-carboxy-19-nor-pregnene-3,20-diones and 17-hydroxy-19-oxo-4-pregnene-3,20-diones, respectively.
7. A process for the production of an intermediate useful in the synthesis of $\Delta^4$-3-oxo-19-nor-steroid, which comprises heating 10-carboxy-19-nor-4-androstene-3,17-dione in pyridine at a temperature of about 120° C., whereby conversion to 19-nor-5(10)-androstene-3,17-dione is effected.

8. A process for the production of 19-nor-4-androstene-3,17-dione which comprises heating on a water-bath a solution of 10-carboxy-19-nor-4-androstene-3,17-dione in methanol in the presence of hydrochloric acid, whereby conversion into the desired 19-nor-4-androstene-3,17-dione is effected.

9. A process for the preparation of 19-nor-4-androstene-3,17-dione which comprises subjecting 19-oxo-4-androstene-3,17-dione in solution in methanol to the action of sodium hydroxide, whereby conversion into the desired 19-nor-4-androstene-3,17-dione is effected.

10. A process for the production of 19-nor-4-androstene-3,17-dione which comprises heating on a water-bath a solution of 19-nor-5(10)-androstene-3,17-dione in methanol in the presence of hydrochloric acid, whereby conversion to the desired 19-nor-4-androstene-3,17-dione is effected.

11. A process for the production of 19-nor-4-pregnene-3,20-dione which comprises subjecting 10-carboxy-19-nor-4-pregnene-3,20-dione in solution in methanol to the action of hydrochloric acid, whereby conversion to the desired 19-nor-4-pregnene-3,20-dione is effected.

12. A process for the preparation of 19-nor-4-pregnene-3,20-dione which comprises subjecting 19-oxo-4-pregnene-3,20-dione in solution in methanol to the action of sodium hydroxide, whereby conversion into the desired 19-nor-4-pregnene-3,20-dione is effected.

13. A process for the production of 10-carboxy-19-nor-4-androstene-3,17-dione which comprises subjecting 19-hydroxy-4-androstene-3,17-dione to the action of chromium trioxide, whereby conversion to the desired 10-carboxy-19-nor-4-androstene-3,17-dione is effected.

14. A process for the production of 10-carboxy-19-nor-4-androstene-3,17-dione which comprises subjecting 19-oxo-4-androstene-3,17-dione to the action of potassium permanganate, whereby conversion to the desired 10-carboxy-19-nor-4-androstene-3,17-dione is effected.

15. A process for the production of 10-carboxy-19-nor-4-pregnene-3,20-dione which comprises subjecting 19-hydroxy-4-pregnene-3,20-dione to the action of chromium trioxide, whereby conversion to the desired 10-carboxy-19-nor-4-pregnene-3,20-dione is effected.

16. A process for the production of 17α-hydroxy-19-nor-4-pregnene-3,20-dione which comprises subjecting 17α,19-dihydroxy-4-pregnene-3,20-dione to the action of chromium trioxide, whereby conversion to the desired 17α-hydroxy-19-nor-4-pregnene-3,20-dione is effected.

No references cited.

UNITED STATES PATENT OFFICE
CERTIFICATE OF CORRECTION

Patent No. 3,014,931                      December 26, 1961

Masamoto Nishikawa et al.

It is hereby certified that error appears in the above numbered patent requiring correction and that the said Letters Patent should read as corrected below.

Column 2, line 65, for "-9-" read -- -19- --; column 5, line 39, for "concentrate" read -- concentrated --; column 6, line 68, for "p oduct" read -- product --; line 69, for "l xample" read -- Example --; column 7, line 64, for "75.74; H, 8.89" read -- 73.49; H, 8.02 --; column 8, line 69, for "-androstene13,17-" read -- -androstene-3,17- --.

Signed and sealed this 14th day of August 1962.

(SEAL)
Attest:

ERNEST W. SWIDER
Attesting Officer

DAVID L. LADD
Commissioner of Patents